United States Patent

Nakajima et al.

[11] Patent Number: 5,949,470
[45] Date of Patent: Sep. 7, 1999

[54] ROLLER UNIT AND IMAGING APPARATUS USING THE SAME

[75] Inventors: Hajime Nakajima, Tokyo; Keiji Ohkoda, Yokohama, both of Japan

[73] Assignee: Canon Kabushiki Kaisha, Tokyo, Japan

[21] Appl. No.: 08/535,584

[22] Filed: Sep. 28, 1995

[30] Foreign Application Priority Data

Oct. 3, 1997 [JP] Japan ................................. 6-263116

[51] Int. Cl.⁶ ........................... B65H 5/06; B41J 13/076; B41J 13/03

[52] U.S. Cl. ...................... 347/262; 347/264; 347/218; 271/272; 271/273

[58] Field of Search ................................. 347/262, 264, 347/218; 271/272, 273, 274

[56] References Cited

U.S. PATENT DOCUMENTS 5,181,715  1/1993  Ohkoda et al. ........................ 271/272
5,359,425  10/1994  Maehara et al. ....................... 258/300

FOREIGN PATENT DOCUMENTS 0610104  8/1994  European Pat. Off. .
03036040  2/1991  Japan .

*Primary Examiner*—Huan Tran
*Attorney, Agent, or Firm*—Fitzpatrick, Cella, Harper & Scinto

[57] ABSTRACT

Disclosed is a roller unit comprising a roller rotatable about a shaft, a bearing for supporting the shaft, and a mechanism for imparting a pre-load to the bearing, characterized in that the mechanism has structure capable of varying the pre-load. This roller unit is mounted on the frame of an imaging apparatus or the like, and is designed such that during the mounting thereof, the pre-load becomes great to thereby eliminate the play (backlash) of the bearing.

10 Claims, 7 Drawing Sheets

ROLLER UNIT AND IMAGING APPARATUS USING THE SAME

BACKGROUND OF THE INVENTION

1. Field of the Invention

This invention relates to a sheet conveying mechanism for conveying a sheet such as photosensitive film with very high accuracy, and an imaging apparatus for recording an image on the sheet conveyed by the sheet conveying mechanism or reading an image recorded on the sheet.

2. Related Background Art

A sheet conveying mechanism as shown in FIGS. 9 and 10 of the accompanying drawings is known as a sheet conveying mechanism used in an image recording or reading apparatus for medical treatment. A roller unit 1 is such that the opposite shaft portions 5a and 5b of a sub-scanning roller 5 are supported by a pair of left and right bearings 3 and 4 mounted on a frame 2. The shaft portions 5a and 5b of the sub-scanning roller 5 are formed with grooves, in which ring-like stoppers 6 and 7 are fitted. A pre-load spring 8 is mounted between the stopper 7 and the bearing 4 so as to impart a moderate pre-load to the sub-scanning roller 5 in the axial direction thereof.

Also, on the shaft portion 5a side of the roller unit 1, a motor is constructed of a rotor 9 provided on the shaft portion 5a and a stator 10 provided on the extension of the frame 2, and an optical type encoder is constituted by a rotor 11 provided on the end portion of the shaft portion 5a and a detecting portion 12 provided on the end of the extension of the frame 2.

The roller unit 1 thus constructed is mounted on the frame 13 of an image recording or reading apparatus through the frame 2.

SUMMARY OF THE INVENTION

The above-described apparatus, however, has suffered from the problem that although the frame 2 is provided and a pre-load of the same force is constantly imparted to the bearings by the pre-load spring 8, the number of parts including the frame 2 increases to thereby increase the cost of the apparatus. Further, the unit structure is complicated and the working property during assembly and maintenance becomes poor.

Also, the frame 2 occupies the space near the sub-scanning roller 5 and this has led to 1) the problem that the other rollers cannot be disposed in proximity thereto, and 2) the problem that when the roller unit is to be removed and inserted, the image apparatus body and the frame 2 are liable to interfere with each other.

It is an object of the present invention to solve the above-noted problems.

A preferred form of the present invention is characterized in that with attention paid to the fact that an appropriate pre-load can be applied to bearings at least when a roller unit is mounted on the frame of an imaging apparatus body, design is made such that when the roller unit is mounted, the pre-load varies and an appropriate pre-load is added.

More specifically, a preferred form of the present invention is a roller unit characterized by a roller rotatable about a shaft, a bearing for supporting the shaft, and a mechanism for imparting a pre-load to the bearing, the mechanism being provided with structure capable of varying the pre-load.

Another preferred form of the present invention is a roller unit characterized by a roller rotatable about a shaft, first and second bearings for supporting the opposite ends of the shaft, a first mechanism for imparting a pre-load to the first bearing in a predetermined direction, and a second mechanism for imparting a pre-load to the second bearing in a direction opposite to the predetermined direction.

Still another form of the present invention is an imaging apparatus provided with one of the roller units. The imaging apparatus herein referred to is an image recording apparatus for recording an image on a sheet, an image reading apparatus for reading an image depicted on a sheet, or the like.

Further objects and preferred forms of the present invention will become apparent from the following detailed description of some embodiments of the invention.

DESCRIPTION OF THE PREFERRED EMBODIMENTS

The present invention will hereinafter be described in detail with respect to some embodiments thereof shown in FIGS. 1 to 8.

Figure 1:
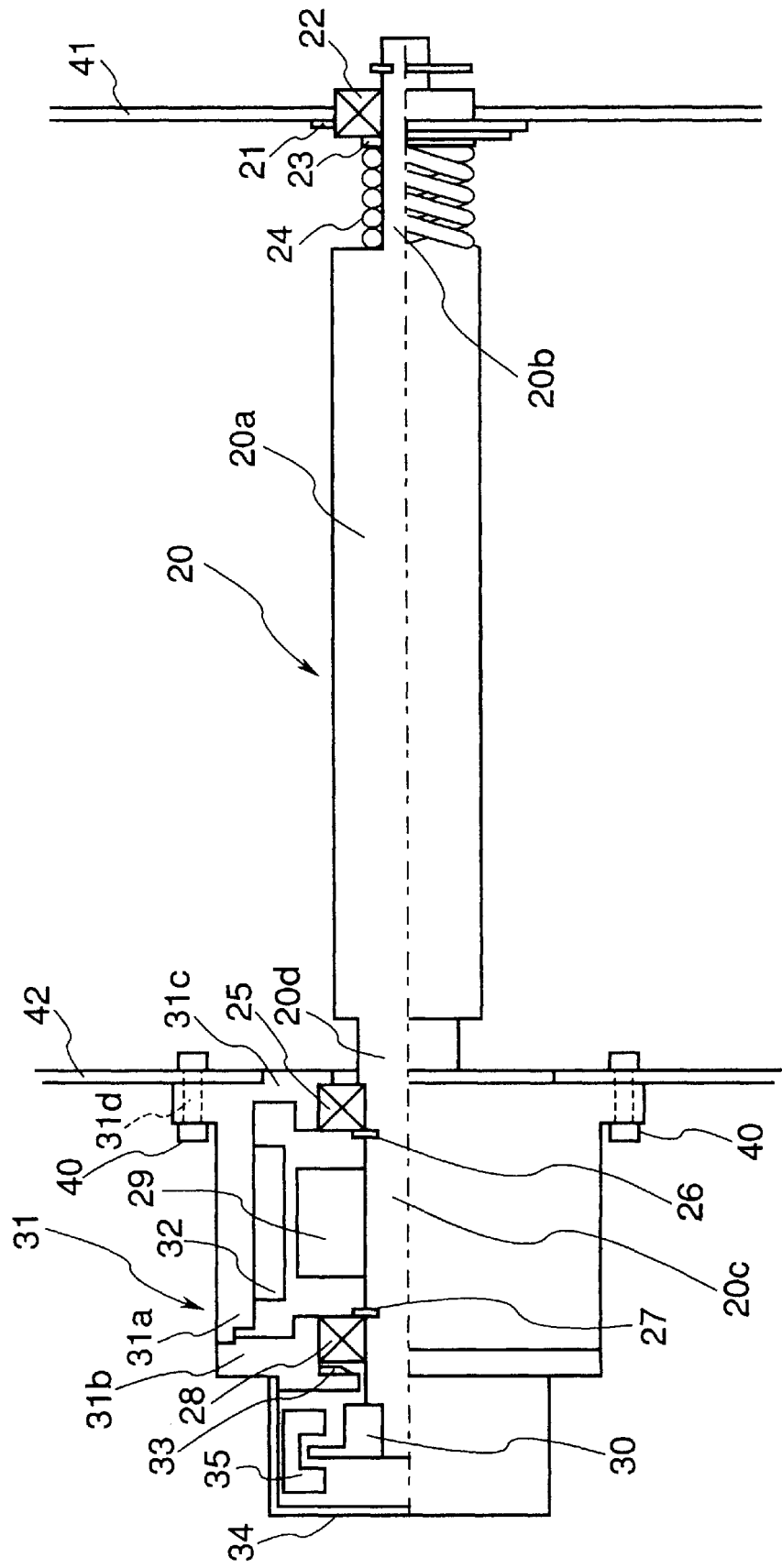
FIG. 1 shows the construction of a sheet conveying mechanism which is a first embodiment of the present invention.
Figure 2:
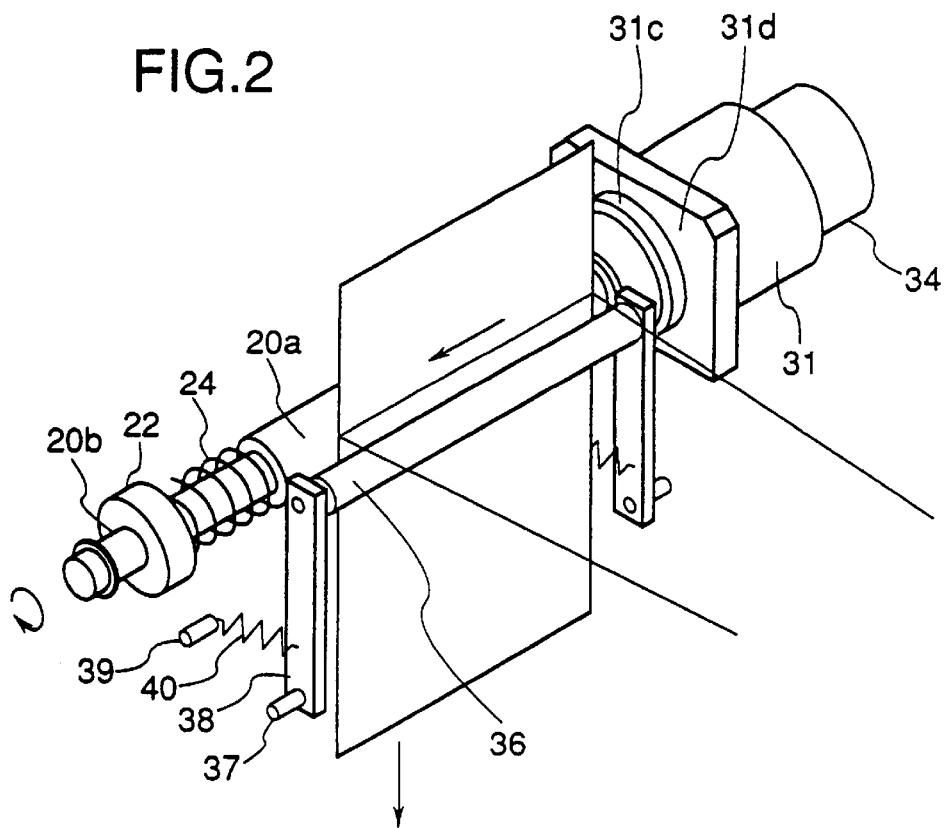
FIG. 2 is a perspective view of the sheet conveying mechanism shown in FIG. 1.

FIGS. 1 and 2 show the construction of a roller unit according to a first embodiment. A roller 20 has the surface of its body 20a subjected to sand blast treatment of moderate roughness, and the left and right portions thereof provide shaft portions 20b and 20c of a diameter smaller than that of the body 20a. A bearing 22 with a snap ring 21 is mounted on one shaft portion 20b, and a compression coil spring 24 having a spring seat 23 on the bearing 22 side is mounted between the bearing 22 and the roller body 20a.

A bearing 25 is mounted on the other shaft portion 20c at a location which is in close contact with a stepped portion 20d provided between the shaft portion 20c and the roller body 20a, and is restrained on the shaft portion 20c by an E-shaped snap ring 26. Also, a bearing 28 likewise restrained on the shaft portion 20c by an E-shape snap ring 27 is mounted on the shaft portion 20c, the rotor 29 of a motor is mounted between the bearings 25 and 28, and the rotor 30 of an optical type encoder is fitted to the end of the shaft portion 20c.

A housing 31 for holding the bearings 25 and 28 is provided in such a manner as to cover the shaft portion 20c, and the stator 32 of the motor is mounted on the inner surface of the housing 31 at a location opposed to the rotor 29, and a drive motor is constituted by the stator 32 and the rotor 29. The housing 31, for the convenience of the assembly thereof, comprises a housing body 31a having a holding portion for the bearing 25 and a mounting portion for the stator 32, and a holding portion 31b for the bearing 28.

A belleville spring 33 for urging the bearing 28 in a direction opposite to the biasing force of the coil spring 24 is attached to the holding portion 31b, and the housing body 31a is provided with a mounting portion 31c with respect to the frame or the like of other apparatus which is formed in a stepped shape protruding toward the roller body 20a, and a flange portion 31d adapted to be pressed against the frame. A cap-like cover 34 covering the rotor 30 of the encoder is attached to the holding portion 31b, and the detecting portion 35 of the encoder is provided in the cover 34.

A roller 36 in FIG. 2 is made into a follower roller mounted on the frame of other apparatus through a shaft 37 and a lever 38 and having a tension spring 40 extended between it and a projection 39 attached to other apparatus and adapted to press the roller 36 against the body 20a of the roller 20 with moderate pressure.

The roller unit thus constructed is mounted by fitting the bearing 22 into one frame 41 of an image recording apparatus or the like, restraining the bearing 22 on the inner surface of the frame 41 by the snap ring 21, fitting the mounting portion 31c into the other frame 42, pressing the flange portion 31d against the outer surface of the frame 42 and fastening a bolt 40.

Figure 3:
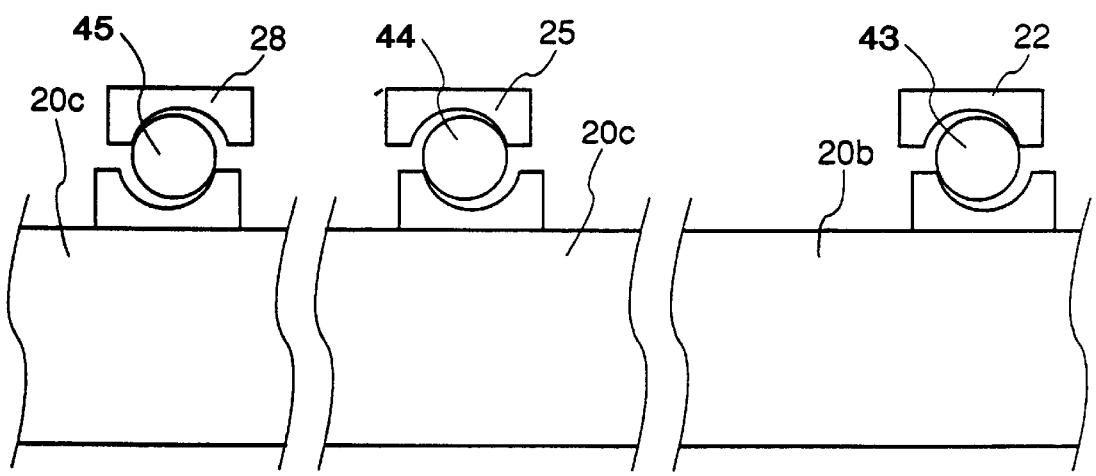
FIG. 3 illustrates the relation between each bearing and the shaft portion of a roller.

Thereupon, as shown in the cross-sectional view of FIG. 3, a moderate pre-load is applied to the roller 20 by the belleville spring 33 through the bearing 28, whereby the play of the bearing 28 is eliminated and also, the play of the bearings 22 and 25 is eliminated by the coil spring 24. The reference numeral 43–45 designates bearing balls. Accordingly, between the roller conveying a sheet and a drive source, there is no factor which deteriorates the stability of the speeds of a belt, a flexible coupling, etc. and the characteristic of the drive source is directly transmitted to the roller and thus, very stable sheet conveyance becomes possible.

Figure 4:
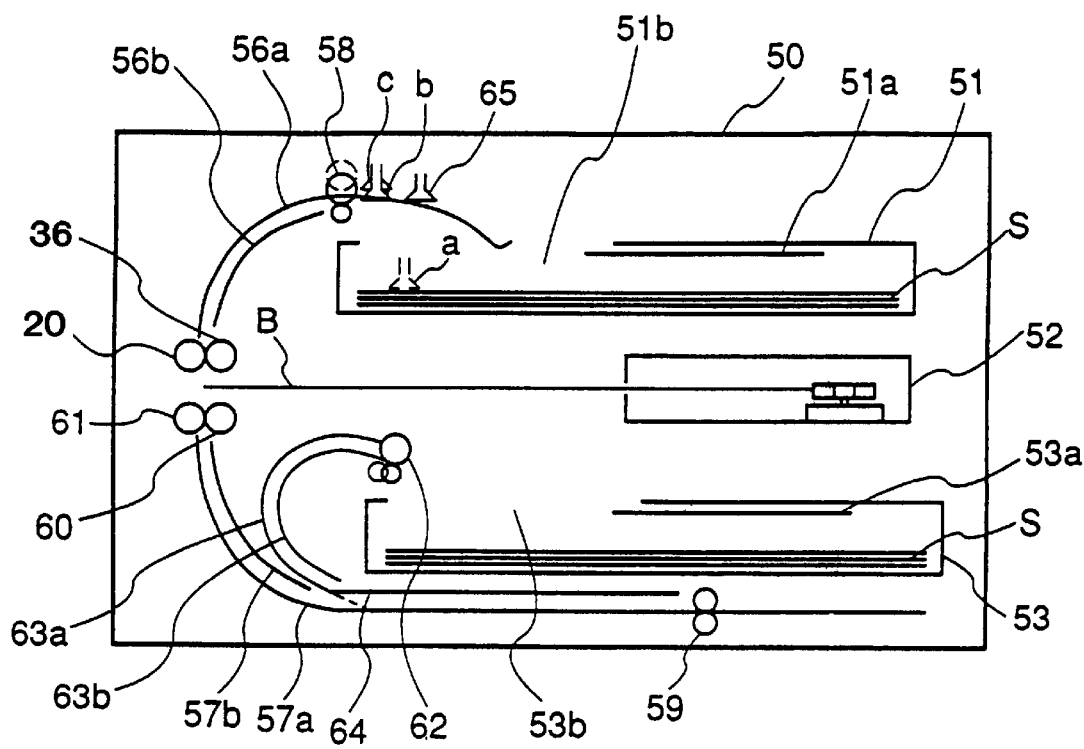
FIG. 4 shows the construction of an image recording apparatus using the sheet conveying mechanism.

FIG. 4 shows the construction of an image recording apparatus for medical treatment using the above-described roller unit. In the apparatus body 50 of the image recording apparatus, a supply magazine 51, an optical unit 52 and a receive magazine 53 are juxtaposed in a horizontal direction on the upper portion, the central portion and the lower portion, respectively, thereof. Piled unused film sheets S are contained in the supply magazine 51 with their photosensitive surfaces facing downward, and recorded film sheets S may be contained in the receive magazine 53. The two magazines 51 and 53 are formed with openings 51b and 53b having openable and closable lids 51a and 53a, respectively. By these lids 51a and 53a being closed, the interiors of the magazine 51 and 53 can be kept light-tight.

Between the opening 51b to the opening 53b, arcuate guide means 56 and 57 comprising outer and inner guides 56a, 56b and 57a, 57b extending in parallelism to each other at a predetermined interval are mounted continuously adjacent to each other so as to form a semicircular shape, and one guide means 56 has its outer guide 56a extended so as to cover the opening 51b, and the other guide means 57 is extended to the lower side of the receive magazine 53 in parallelism thereto.

A pair of first conveying rollers 58 comprising upper and lower rollers are mounted on that end portion of the guide means 56 which is adjacent to the opening 51b, and at least one of the pair of first conveying rollers 58 is a drive roller and the upper roller is of such a shape that a short roller is disposed on a shaft, and is movable toward and away from a bearing position in which it bears against the lower roller through a cut-out formed in the guide 56a as indicated by solid line and a separated position indicated by dash-and-dot line.

Also, a pair of second conveying rollers 59 comprising upper and lower rollers are provided on the extension of the guide means 57, and a sheet conveying mechanism as shown in FIGS. 1 and 2 wherein the roller 20 and follower roller 36 are a pair of first sub-scanning rollers and a pair of second sub-scanning rollers comprising rollers 60 and 61 are provided between the rear end of the guide means 56 with respect to the direction of conveyance and the fore end of the guide means 57 with respect to the direction of conveyance, whereby a sub-scanning conveying mechanism is constructed.

A pair of third conveying rollers 62 comprising upper and lower rollers are provided above the fore end of the receive magazine 53, and the lower roller is retractable to a position indicated by dot-and-dash line. Also, guide means 63 meeting the guide means 57 from the front side of the pair of third conveying rollers 62 is constituted by a pair of arcuate guide 63a and 63b.

A movable guide 64 pivotally movable to a closing position indicated by dot-and-dash line for closing the conveyance path of the guide means 57 and a liberating position indicated by solid line for liberating the conveyance path is mounted on the lower end of the outer guide 63a by a support shaft, and the guide 57a is formed with a cut-away in that portion thereof which corresponds to the tip end of the movable guide 64 so that during closing, the movable guide 64 may not bear against the guide 57a.

On the other hand, above the extension of the guide 56a, a plurality of suckers 65 movable to a position a in the supply magazine 51 indicated by dot-and-dash line, a position b on this side of the pair of first conveying rollers 58 indicated by dot-and-dash line, and a position c above it indicated by dot-and-dash line, by a mechanism, not shown, through a cut-out hole formed in the guide 56a are provided on a line from the near side toward the inner side.

Figure 5:
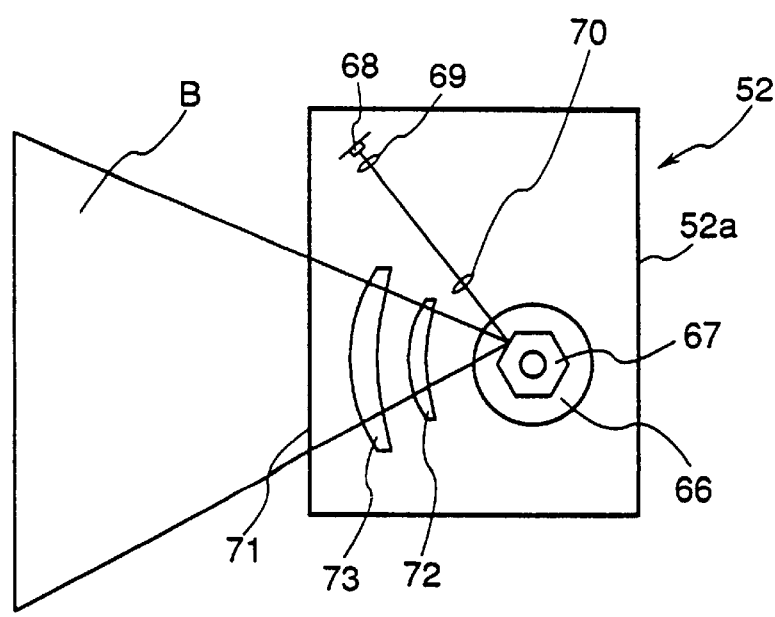
FIG. 5 shows the construction of an optical unit.

On the other hand, the optical unit 52, as shown in FIG. 5, has in an exterior package (case 52a) a rotatable polygon mirror 67 directly connected to a motor 66, a laser source for applying a light beam B toward the rotatable polygon mirror, and two lenses 69 and 70 provided between the rotatable polygon mirror and the laser source. Further, an exit window 71 is provided on the recording position side of the exterior package case 52a between the pairs of first and second scanning rollers 20, 36 and 60, 61, and first and second scanning lenses 72 and 73 are provided between the rotatable polygon mirror 67 and the exit window 71.

In the thus constructed recording apparatus, when an image is to be recorded, the suckers 65 are driven by a driving device, not shown, and are moved to the upper surface opposite to the photosensitive surface of the uppermost film sheet S in the supply magazine 51 to thereby suck the film sheet S in the position a of FIG. 4. At this time, the pair of first conveying rollers 58 are being rotated while bearing against each other. Subsequently, the suckers 65 are moved to the position b and the leading end of the film sheet S is nipped between the pair of first conveying rollers 58, whereupon the suckers 65 release their sucking of the film sheet S and are retracted to the position c.

Then, the film sheet S nipped between the pair of first conveying rollers 58 is conveyed through a conveyance path formed by the guide means 56 and is sent to the pairs of first and second sub-scanning rollers. Here, the laser beam B modulated by an image signal is applied from the light source 68 of the optical unit 52 to the film sheet S, and is scanned by the rotatable polygon mirror 67 through the scanning lenses 72 and 73, whereby an image is recorded on the film sheet S.

The film sheet S on which the recording has been after the recording is conveyed through a conveyance path formed by the guide means 57 and immediately before the leading end of the film sheet S arrives at the pair of second conveying rollers 59, is conveyed by the pair of second conveying rollers 59 until the trailing end of the film sheet S passes through the movable guide 64. Thereupon, detecting means, not shown, detects that the trailing end of the film sheet S has passed the position of the movable guide 64, and the movable guide 64 which has so far been in the liberating position assumes the closing position and at the same time, the pair of second conveying rollers 59 are reversely rotated.

The film sheet S is conveyed along the movable guide 64 and into a conveyance path formed by the guide means 63, and is further sent into the receive magazine 53 by the pair of third conveying rollers 62, whereupon the lower roller is moved to its dot-and-dash line position and the film sheet S is dropped into and contained in the receive magazine without being caught by the roller.

While FIG. 4 shows an example of an image recording apparatus, the present invention can of course be also applied to an image reading apparatus for beam-scanning and reading an image on a sheet.

Figure 6:
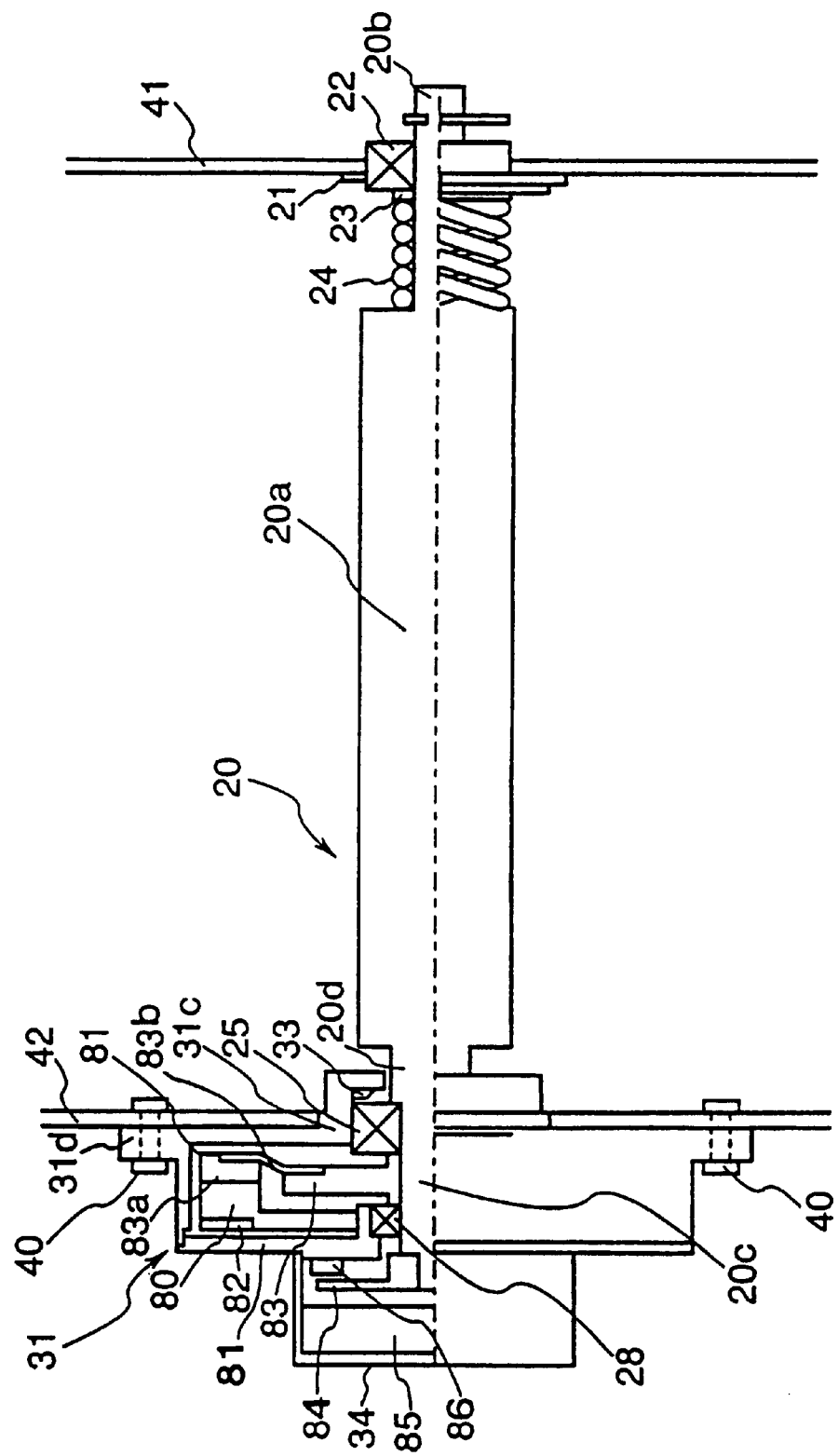
FIG. 6 shows the construction of a sheet conveying mechanism which is a second embodiment of the present invention.

FIG. 6 shows a second embodiment of the roller unit. In this embodiment, the disposition of the pre-load spring in the first embodiment is changed and instead of the motor in the driving unit, an ultrasonic motor is used and in lieu of the optical type encoder, a laser rotary encoder is incorporated.

That is, a belleville spring 33 is mounted between the bearing 25 and the inner surface of the mounting portion 31c in the housing 31. The stator 80 of the motor is formed of a resilient material such as stainless steel and is fixed to a pedestal 81, and an electrostrictive element 82 is mounted on one surface of the stator 80. Accordingly, a travelling wave travelling with time is created in that portion of the stator 80 which is in contact with a rotor 83.

The rotor 83 is provided with a pre-load portion 83b fixed to the sub-scanning roller 20 and imparting a pre-load to a contact portion 83a which is in contact with the stator 80, whereby an ultrasonic motor is constituted. Also, the end portion of the shaft portion 20c is provided with a laser rotary encoder portion comprised of a disc-like diffraction grating 84, an optical system 85 including a prism, etc., a reflecting optical system 86, etc.

Figure 7:
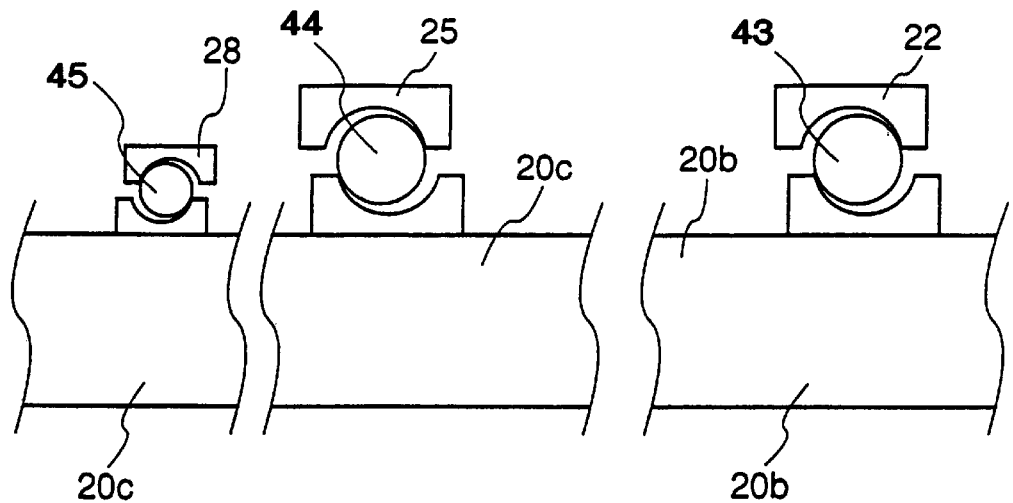
FIG. 7 illustrates the relation between each bearing and the shaft portion of a roller.

In the thus constructed roller unit, the ultrasonic motor is compact and light in weight and is very high in speed stability even during constant speed rotation and moreover creates a high torque and therefore, the stability of the sheet conveying speed becomes very good and good recording which is problematic with any fluctuation of conveyance resistance becomes possible. FIG. 7 shows a state in which a pre-load is being applied to the bearing 28 by the belleville spring 33 in this second embodiment. Also, the laser rotary encoder portion is small and light in weight and the inertia of the rotary portion thereof is small and can moreover generate a pulse of high resolving power of 50,000 pulses or more per one full rotation and therefore, more highly accurate control becomes possible, and this is suitable for an ultrasonic motor of good control responsiveness.

While in each of the above-described embodiments, a resilient member is used as the pre-load means, the resilient member need not always be used, but pre-load means using a magnetic force may also be used and the attraction or repulsion of a permanent magnet may be utilized. If an electromagnet is used, it will be possible to freely control the pre-load.

The surface treatment of the rollers need not always be sand blasting, but the surfaces of the rollers may instead be coated with rubber. By this rubber coating, the coefficient of friction of the surfaces of the rollers is enhanced and a great conveying force will be obtained even if the nipping force for the sheet is small. Any special surface treatment need not be done, and the urging force of the follower roller may be enhanced to thereby increase the conveying force.

Figure 8:
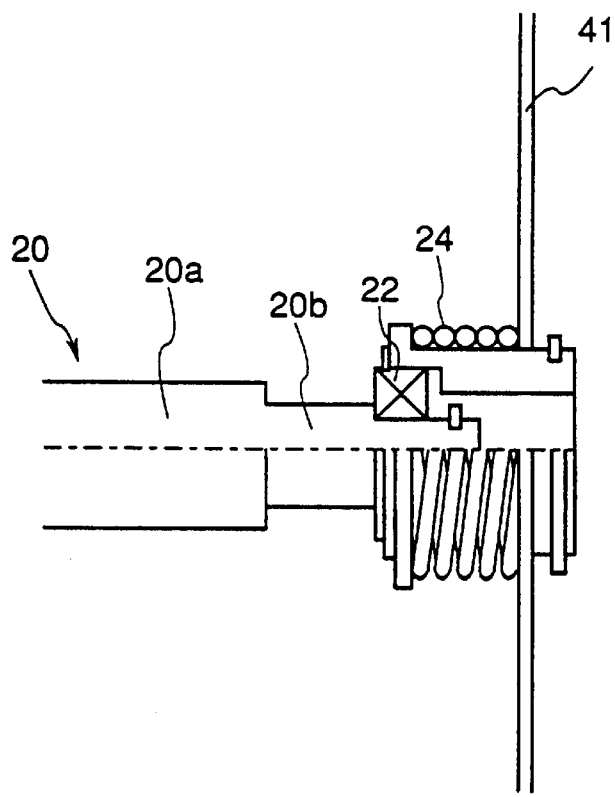
FIG. 8 is a fragmentary cross-sectional view of another example of the coil spring mounting portion of the sheet conveying mechanism.
Figure 9:
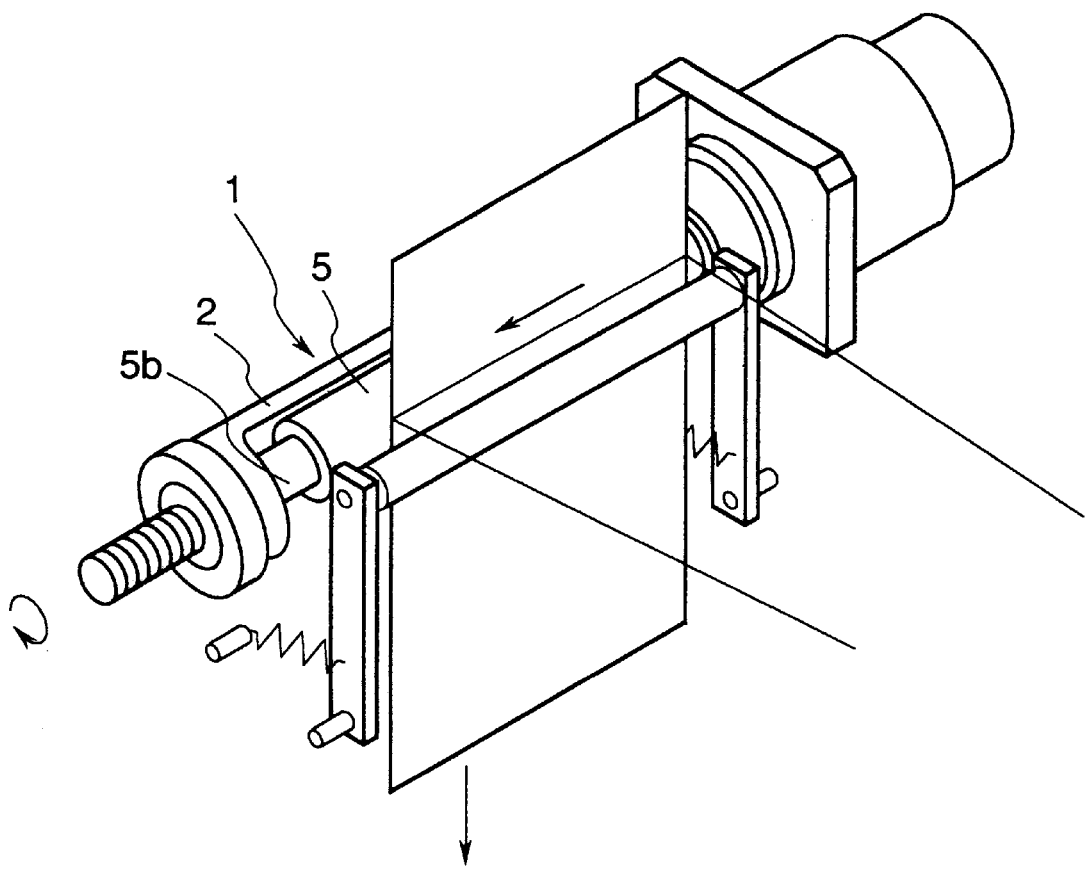
FIG. 9 is a perspective view of an example of the sheet conveying mechanism according to the prior art.
Figure 10:
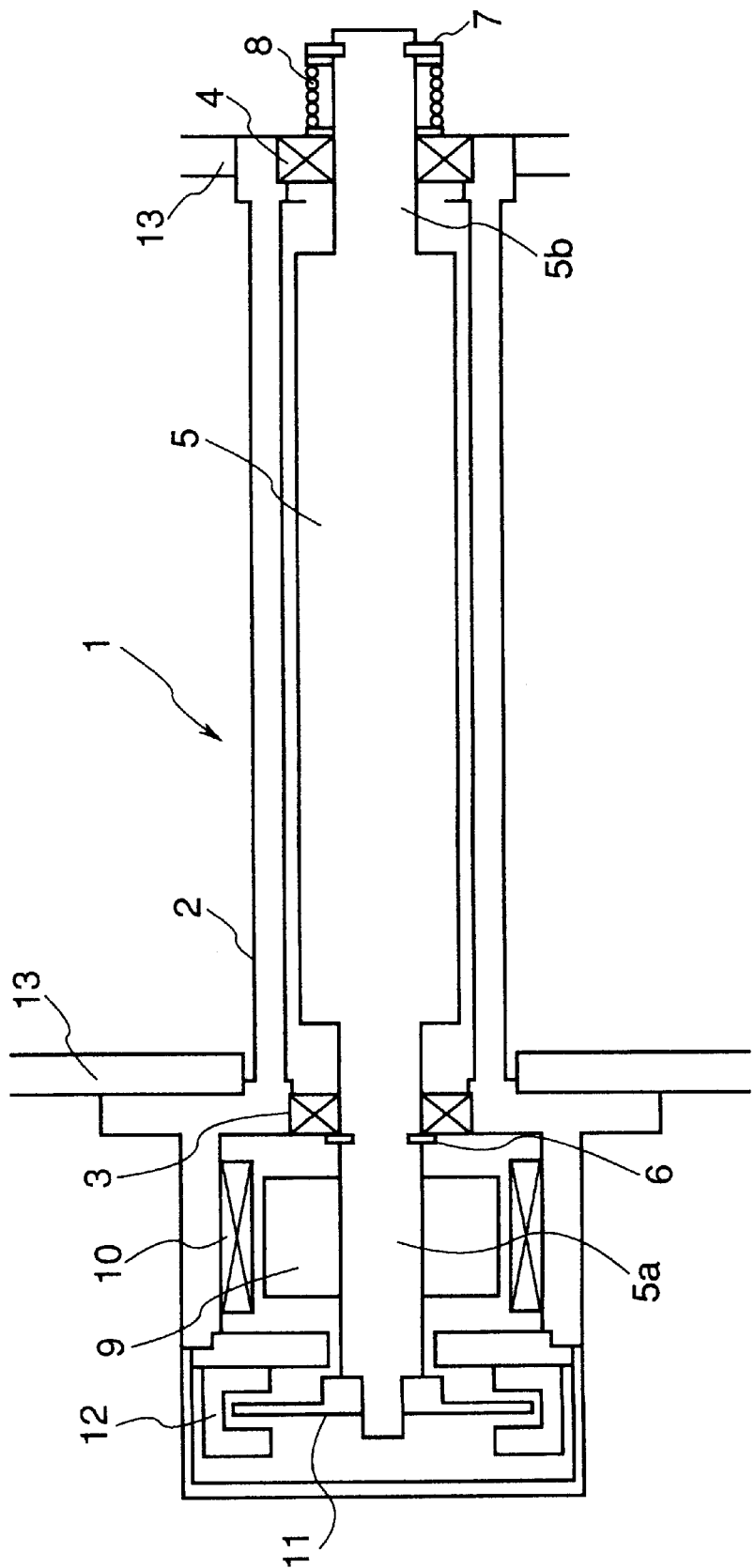
FIG. 10 is a cross-sectional view of the sheet conveying mechanism of FIG. 9.

Further, as shown in FIG. 8, the coil spring 24 which is the pre-load means need not be disposed on the roller shaft 20b, but may be disposed on the frame 41 side of the body of the recording apparatus to which is fitted the bearing 22 on the end portion of the roller shaft 20b.

A jig designed equivalently to the frame of the sub-scanning conveying mechanism may be mounted and the evaluation of the motor may be effected, whereby the measurement of the characteristic of the motor equivalent to a state in which the roller unit is incorporated into the apparatus using it becomes possible and therefore, the optimum design of the control characteristic of the motor becomes easy. Further, it is also possible to decrease the wow and flutter of a particular frequency band in accordance with the characteristic of visual sensation and improve the quality of image.

What is claimed is:

1. A conveyance roller unit, to be mounted to an apparatus having a conveying mechanism, said conveyance roller unit comprising:
   a roller rotatable about a shaft;
   a bearing for supporting said shaft, said conveyance roller unit being mounted to said apparatus by attaching said bearing to a frame of said apparatus; and
   a mechanism for imparting a pressure to said bearing, said mechanism having a structure capable of varying the pressure, the pressure being increased by mounting said conveyance roller unit to said apparatus.

2. A conveyance roller unit according to claim 1, having a drive source for driving said roller.

3. A conveyance roller unit according to claim 1, having an encoder for detecting the rotation of said roller.

4. A conveyance roller unit to be mounted to an apparatus having a conveyance mechanism, said conveyance roller unit comprising:
   a roller rotatable about a shaft;
   first and second bearing units for supporting opposite ends of said shaft, said first bearing unit having first and third bearings for supporting said shaft and said second bearing unit having a second bearing for supporting said shaft, said conveyance roller unit being mounted to said apparatus by attaching said first and second bearing units to a frame of the apparatus;

a first mechanism for imparting a pressure between said first bearing and a housing of said first bearing unit, wherein said first mechanism imparts the pressure to said third bearing via said first bearing and said shaft; and a second mechanism for imparting a pressure between said second bearing and shaft by attaching said second bearing unit to the frame.

5. A conveyance roller unit according to claim 4, having a drive source for driving said roller.

6. A conveyance roller unit according to claim 4, having an encoder for detecting the rotation of said roller.

7. An imaging apparatus, having a conveyance roller unit mounted thereon as a conveyance mechanism, said apparatus comprising:

imaging means for recording an image on a sheet or reading an image;

a frame for holding said imaging means; and a roller unit mountable with respect to said frame for conveying the sheet, said roller unit including:

a roller rotatable about a shaft;

a bearing for supporting said shaft, said conveyance roller unit being mounted to said apparatus by attaching said bearing to a frame of said apparatus; and a mechanism for imparting a pressure to said bearing, said mechanism having a structure for increasing the pressure when said roller unit is mounted to said frame.

8. An imaging apparatus according to claim 7, wherein said imaging means has means for causing a beam to scan the sheet.

9. A conveyance roller unit according to claim 4, said second mechanism imparts the pressure to said bearing in an opposite direction relative to a direction in which said first mechanism imparts the pressure to said first bearing.

10. A conveyance roller unit according to claim 4, wherein said second mechanism imparts the pressure to said second bearing in the same direction as said first mechanism imparts the pressure to said first bearing.

* * * * *

UNITED STATES PATENT AND TRADEMARK OFFICE
CERTIFICATE OF CORRECTION

PATENT NO. : 5,949,470
DATED : September 7, 1999
INVENTOR(S) : Hajime Nakajima, et al.

It is certified that error appears in the above-identified patent and that said Letters Patent is hereby corrected as shown below:

Title page, item
[30] <u>Foreign Application Priority Data</u>:
"Oct. 3, 1997" should read --Oct. 3, 1994--.

Title page, item
[56] <u>FOREIGN PATENT DOCUMENTS</u>:
"03036040" should read --3-036040--.

<u>COLUMN 4</u>:
Line 25, "guide" should read --guides--.

<u>COLUMN 5</u>:
Line 10, "been" should read --been completed--.

Signed and Sealed this

Twentieth Day of March, 2001

Attest:

NICHOLAS P. GODICI

*Attesting Officer*         *Acting Director of the United States Patent and Trademark Office*